United States Patent [19]
Wujcik et al.

[11] Patent Number: 5,179,131
[45] Date of Patent: Jan. 12, 1993

[54] PROCESS FOR THE PREPARATION OF POLYURETHANE FOAMS EMPLOYING POLYOL DISPERSIONS CONTAINING POLYISOCYANATE POLYADDITION SOLIDS

[75] Inventors: Steven E. Wujcik, Romulus; Donald L. Christman, Grosse Ile; Oscar M. Grace, Troy, all of Mich.

[73] Assignee: BASF Corporation, Parsippany, N.J.

[21] Appl. No.: 815,299

[22] Filed: Dec. 27, 1991

[51] Int. Cl.$^5$ .............................................. C08G 18/14
[52] U.S. Cl. .................................. 521/130; 521/157; 524/724; 524/759; 524/761; 528/44; 528/48; 528/49; 528/52; 528/53
[58] Field of Search ................ 521/130, 157; 524/724, 524/759, 761; 528/44, 48, 49, 52, 53

[56] References Cited

U.S. PATENT DOCUMENTS 4,374,209 2/1983 Rowlands ............................ 524/762

Primary Examiner—Maurice J. Welsh
Attorney, Agent, or Firm—William G. Conger

[57] ABSTRACT

Addition of minor quantities of mono- or dicarboxylic acids to polyurethane foam formulations which employ polyisocyanate polyaddition polymer polyol dispersions prevents shrinkage and tightness in polyurethane foams prepared therefrom. If acid addition is made directly after dispersion preparation, reduction of polyol viscosity and more rapid stabilization against viscosity change is observed.

24 Claims, No Drawings

PROCESS FOR THE PREPARATION OF POLYURETHANE FOAMS EMPLOYING POLYOL DISPERSIONS CONTAINING POLYISOCYANATE POLYADDITION SOLIDS

BACKGROUND OF THE INVENTION

1. Field of the Invention

The subject invention pertains to polyurethane foams prepared from polyol dispersions having as the dispersed phase solids derived from polyisocyanate polyaddition. More particularly, the subject invention pertains to a process for preparing such foams wherein a carboxylic acid is added to the polyol dispersion prior to reaction with isocyanate to produce polyurethane foams. The invention further pertains to a method for reducing and/or stabilizing polyisocyanate polyaddition polymer polyol dispersion viscosity.

2. Description of the Related Art

Polyurethane foams are well established items of commerce. Such foams are generally prepared by the reaction of a polyisocyanate, i.e. an organic isocyanate having two or more isocyanate groups per molecule, with a polyol, generally a hydroxyl functional polyoxyalkylene polyether polyol. By controlling the functionality of the isocyanate and the molecular weight and functionality of the polyol, polyurethane foams ranging from exceptionally soft, flexible foams to quite rigid foams may be prepared.

In order to increase the mechanical properties of polyurethane foams, it has become commonplace to utilize polyols containing dispersed solids. Common polyol dispersions are, for example, the so-called "graft polyols" which are stable dispersions of vinyl polymers, generally homopolymers or copolymers of acrylonitrile and styrene. Such polyols can increase the load bearing capacity of polyurethane foams, for example, when used as the sole polyol component or in admixture with conventional polyether polyols. Other polyols, for example polyester polyols may be added to these mixtures as well, as can also chain extenders such as short chain diols, diamines, or alkanolamines.

Recently, polyol dispersions containing polyisocyanate polyaddition products as the dispersed phase have become commercially available. These dispersions are prepared, for example, by reacting a polyisocyanate with itself or an active hydrogen compound, generally in situ in a polyol. Thus isocyanates may be reacted with themselves (trimerized) to form polyisocyanurate (PID) dispersions; with hydrazine to form polyhydrazodicarbonamide (PHD) dispersions; with amines to form polyurea dispersions (PUD); with alkanolamines to form polyurethane urea dispersions and with primary hydroxyl polyols to form polyurethane dispersions (PURD). When reacted with di- and trialkanolamines, the dispersions are termed PIPA polyols by those skilled in the art. Such polyisocyanate addition products, used in its general sense to include all of the above dispersions (PID, PUD, PHD, PURD, PIPA) may have shorter process cycles than graft polyols and be more economical to produce. The properties of foams prepared from such dispersions also have different physical properties, in particular enhanced fire retardancy, and in general may require different formulations.

It has been discovered that many polyisocyanate polyaddition polyol dispersions exhibit changing viscosities following preparation. In particular, the viscosities may increase with respect to time. Low and constant viscosities are desirable. It has further been found that polyurethane foams prepared from such dispersions produce tight foams which may also shrink after foaming. To overcome these drawbacks, special silicone surfactants and narrow formulation ranges have been required. In some cases, in addition to water as a reactive blowing agent, air frothing of the unreacted polyol/polyisocyanate mixture is necessary. Such procedures have limited the commercialization of these polyols or increased processing and equipment costs.

SUMMARY OF THE INVENTION

It has now been surprisingly discovered that the addition of mono- and dicarboxylic acids corresponding to the formula

$$R-[COOH]_n$$

where n is 1 or 2 and wherein R is a $C_1-C_{18}$ alkyl group when $n=1$ and a $C_1-C_{18}$ alkylene group when $n=2$ to a polyisocyanate polyaddition polyol dispersion enables the preparation of polyurethane foams which do not shrink or in which shrinkage is reduced, and are more open celled in flexible foam formulations than in the absence of the carboxylic acid. When the carboxylic acid is added to the polyisocyanate polyaddition polyol dispersion shortly after manufacture, an additional benefit is a more rapid stabilization of polyol viscosity at a reduced viscosity level.

DESCRIPTION OF THE PREFERRED EMBODIMENTS

The polyisocyanate polyaddition polyols utilized in the subject process may be prepared by conventional methods. For example, polyol dispersions containing as a dispersed phase polyisocyanurate polymers having pendant urea groups may be prepared as disclosed in U.S. Pat. No. 4,386,167; polyisocyanurate dispersions may be prepared as disclosed in U.S. Pat. Nos. 4,359,541 and 4,359,550; and halogenated alcohol modified polyisocyanurate dispersions may be prepared as disclosed in U.S. Pat. No. 4,326,043.

Polyurea dispersions may be prepared as disclosed in U.S. Pat. Nos. 4,296,213; 4,518,778; and 4,093,569. Dispersions may also be prepared by reacting an alkanolamine with a polyisocyanate in the presence of a polyether polyol, as disclosed in U.S. Pat. Nos. 4,452,923 and 4,374,209. Dispersions formed by reaction of an aminoplast or phenoplast with a polyisooyanate are disclosed in U.S. Pat. No. 4,260,530, while polyurethane dispersions prepared by reaction of a polyisocyanate with primary hydroxyl short chain diols are disclosed in U.S. Pat. Nos. 4,438,252 and 4,497,913.

PHD dispersions may be prepared as taught in U.S. Pat. No. 4,093,569 by reacting an isocyanate with hydrazine in situ in a polyether polyol also containing more than 4 weight percent water.

The carboxylic acids utilized by the subject invention are mono- and dicarboxylic acids having the carboxylic group attached to an alkyl or alkylene group having at least one carbon atom. Thus, preferred carboxylic acids include acetic acid, propionic acid, butyric acid, hexanoic acid, 2-ethylhexanoic acid, and the like. Dicarboxylic acids such as butanedioic acid, azelaic acid, and adipic acid are also suitable. Surprisingly, oxalic acid, having no intervening alkylene group between the carboxylic acid groups fails to provide the same results.

The amount of carboxylic acid will vary with the chemical nature of the polyisocyanate polyaddition dispersed phase, the weight percent of the dispersed phase, and the time of addition to the polyol dispersion. Amounts of from 0.01 parts by weight carboxylic acid to 3 parts by weight may be utilized, preferably from about 0.05 parts by weight to 0.5 parts by weight, all based on 100 parts polyol. The appropriate effective amount can be readily ascertained by simple hand mix foam tests routinely practiced by those skilled in the art. To perform such tests, increasing amounts of carboxylic acid are added to polyol dispersion samples and reacted with isocyanates in hand mixes. The minimum effective amount of carboxylic acid is an amount which is just in excess of that required to prevent excessive foam shrinkage. Greater amounts of carboxylic acid generally cause greater openness of the foam structure, in some cases leading to foam collapse. However, this increased amount may be desirable nevertheless, as the polyurethane catalyst level may be increased or a more active catalyst utilized to cause more rapid gelation, thus providing a non-shrinking, open celled, high quality product.

It has been found that the amount of carboxylic acids required when the carboxylic acid is added to the polyol dispersion just prior to reaction with isocyanate or in the mix head of commercial polyurethane equipment is different than the amount required when added previously to the polyol. Thus, addition to the polyol 10 to 24 hours before use is preferred. Most preferably, the carboxylic acids are added following preparation of the polyol dispersion itself, as this time of addition generally results in the most rapid stabilization of the dispersion, generally at a lower viscosity than when addition is delayed.

The invention may now be illustrated by reference to the following examples.

EXAMPLE 1

A polyisocyanate polyaddition polymer dispersion was prepared by the method disclosed in U.S. Pat. No. 4,374,209 utilizing as reactants 22.5 parts diethanolamine, 18 parts triethanolamine, 1.62 parts dibutyltindilaurate (dissolved in dioctylphthalate 1:5) and 63 parts of toluenediisocyanate. The initial mix time was 10 seconds, following which an exotherm was observed which elevated the temperature from room temperature to a maximum of 122° F. after 10 minutes. The reaction was allowed to continue for 30 minutes after which the temperature had fallen to 116° F. The base polyol was a glycerine and propylene glycol initiated polyol having a functionality of 2.6, a hydroxyl number of 56, and containing 88 weight percent oxypropylene and 9.1 weight percent oxyethylene residues.

EXAMPLES 2-3, COMPARATIVE EXAMPLES 2A AND 3A

To a sample of polyol dispersion as prepared in Example 1 was added 2-ethylhexanoic acid in an amount of 0.593 mg/g (Example 2). A sample was also left untreated (Example 2A). A commercial polyol similar to that prepared in Example 1 was obtained and similarly treated (Example 3). A control was left untreated (Example 3A). Viscosity in all samples was measured at various time intervals at 25° C. utilizing a Brookfield viscometer. The results are presented in Table I below.

TABLE I

| Example: | 2 | 2A | 3 | 3A |
|---|---|---|---|---|
| Acid Treated: | Yes | No | Yes | No |
| Viscosity (cps) After | | | | |
| 1 hour | 3700 | 3790 | — | — |
| 1 day | 3850 | 4270 | 4710 | 4680 |
| 7 days | 3890 | 4360 | 4690 | 4760 |
| 14 days | 3940 | 4360 | 4710 | 4740 |
| 28 days | 3940 | 4390 | 4710 | 4760 |

As can be seen from the table, addition of the carboxylic acid results in both a lower viscosity product as well as more rapid viscosity stabilization. The effect is greatest when the carboxylic acid is added to the dispersion immediately following preparation, however is still effective even with previously prepared dispersions.

In the foam examples which follow, the following raw ingredients are utilized.

| | |
|---|---|
| DC-5043 - | a silicone surfactant available from Dow Corning. |
| B-4113 - | a silicone surfactant available from Goldschmidt, A. G. |
| Dabco 33-LV | an amine catalyst available from Air Products and Chemicals Inc. |
| Niax A-1 | an amine catalyst available from Union Carbide Chemical Co. |
| T-12 | dibutyltindilaurate |
| 2-EHA | 2-ethylhexanoic acid |
| DEOALF | diethanolamine 85 wt. %, water 15 wt. % |
| FR | tris[1,3-dichloropropyl]phosphate flame retardant |
| Antiblaze 100 | bis[chloroalkyl]phosphate ester flame retardant supplied by Albright & Wilson Americas, Inc. |

Flexible foam formulations were prepared using as the polyol component the PIPA polyol of Example 1. Each formulation contained, in parts by weight, 300 parts PIPA polyol, 7.5 parts Antiblaze 100, and TDI (toluene diisocyanate) at 100 index. The remaining ingredients, physical properties, and comments are as follows:

TABLE II

| EXAMPLE | WATER | DC-5043 | B-4113 | DABCO 33LV | A-1 | T-12 | ACID/AMOUNT | DENSITY | AIR FLOW | COMMENTS |
|---|---|---|---|---|---|---|---|---|---|---|
| 5 | 9.9 | 1.5 | 4.5 | — | 0.3 | — | — | 2.38 | 3.1 | Shrank |
| 6 | 9.9 | 1.5 | 4.5 | — | 0.3 | 0.1 | — | — | — | Very Tight |
| 7 | 9.9 | 1.5 | 4.5 | — | 0.3 | — | 0.18 EHA[1] | — | — | Foam Collapsed |
| 8 | 9.9 | 1.5 | 4.5 | — | 0.3 | 0.1 | 0.18 EHA[1] | 2.10 | 1.2 | — |
| 9 | 9.9 | 1.5 | 4.5 | — | 0.3 | — | 1.08 EHA[1] | — | — | Foam Collapsed |
| 10 | 9.9 | 1.5 | 4.5 | — | 0.3 | 0.1 | 1.08 EHA[1] | 2.23 | 3.8 | — |
| 11 | 9.0 | 4.2 | — | 0.45 | 0.15 | 0.3 | 1.08 EHA[1] | 3.04 | 0.35 | — |
| 12 | 9.0 | 4.2 | — | 0.45 | 0.15 | 0.3 | 1.08 EHA[2] | — | — | Partial Collapsed |
| 13 | 9.0 | 4.2 | — | 0.45 | 0.15 | 0.3 | 1.08 acetic[1] | 3.44 | 0.35 | Slight Shrinkage |
| 14 | 9.0 | 4.2 | — | 0.45 | 0.15 | 0.3 | 1.08 acetic[2] | 2.96 | 0.36 | Slight Shrinkage |
| 15 | 9.0 | 4.2 | — | 0.45 | 0.15 | 0.3 | 1.08 proprionic[1] | 2.89 | 0.74 | — |

TABLE II-continued

| EXAMPLE | WATER | DC-5043 | B-4113 | DABCO 33LV | A-1 | T-12 | ACID/AMOUNT | DENSITY | AIR FLOW | COMMENTS |
|---|---|---|---|---|---|---|---|---|---|---|
| 16 | 9.0 | 4.2 | — | 0.45 | 0.15 | 0.3 | 1.08 proprionic[2] | 4.30 | 0.23 | — |

[1]Acid added just prior to mixing ingredients
[2]Acid premixed (1 day) to polyol

EXAMPLES 17–18

A foam was prepared utilizing as the polyol component a hydrolyzed polyisocyanurate dispersion (PID) polyol in the amount of 120 parts, and 180 parts of the same polyether polyol used to prepare the dispersion of Example 1. The formulation was otherwise as in Examples 11–16. Example 17 contained no 2-ethylhexanoic acid (2-EHA) while Example 18 contained 0.54 parts acid. The foam without 2-EHA shrunk severely while that containing 2-EHA exhibited much less shrinkage, showing that a larger processing window is available with this PID polyol when the carboxylic acids of the invention are added. The foams prepared with and without 2-EHA were clearly different. While not wishing to be bound by theory, this may be due to complete reaction of the isocyanate in the PID polyol dispersion which occurred during its preparation and isolation.

EXAMPLES 19–20

Formulations as in Examples 17–18 with and without 2-EHA were prepared but utilizing Multranol ® polyol 9151 instead of the hydrolyzed PID polyol. Example 17 produced an acceptable but tight foam while Example 18 with 2-EHA added showed total collapse, again illustrating greater processing latitude.

EXAMPLES 21–33

Machine runs were made with formulations similar to the preceding examples containing various levels of diethanolamine, and 2-ethylhexanoic acid blended with the silicone stream, blended with the flame retardant stream, and blended with the polyol 12 hours before running. Foams were also prepared without addition of acid. Diethanolamine is a desired additive in high resilience foams as it tends to decrease foam hardness while increasing the sag factor. The results of these tests, employing 0.18 parts 2-ethylhexanoic acid per 100 parts polyol in a 1.8 pound/ft³ foam at 100 index, indicate the following:

a) Foams prepared without 2-ethylhexanoic acid have poor processability at 1.8 pcf density;
b) Addition of 2-ethylhexanoic acid at the mix head, whether blended with silicone or flame retardant, produces unstable foam (collapse) which may be overcome through change in catalyst; and,
c) Addition of 2-ethylhexanoic acid to the polyol 12 hours before use produced good foam with a wide processing latitude with respect to addition of diethanolamine.

TABLE III

| FOAM FORMULATIONS FOR EXAMPLES 21-33 | | | | | | | |
|---|---|---|---|---|---|---|---|
| FORMULATION | 21 | 22 | 23 | 24[1] | 25[1] | 26[1] | 27[2] |
| Polyol of Ex. 1 | 100 | → | → | → | → | → | → |
| 2-ETHYLHEXANOIC ACID | — | — | — | — | — | — | — |
| WATER (TOTAL) | 3.60 | → | → | → | → | → | → |
| DEOALF | — | 2.0 | 1.0 | — | 2.0 | 1.0 | 2.0 |
| DC 5043 | 1.0 | → | → | 1.0 | → | → | 1.0 |
| 2-ETHYLHEXANOIC ACID | — | — | — | 0.18 | → | → | — |
| DABCO 33LV | 0.15 | → | → | → | → | → | → |
| NIAX A-1 | 0.05 | → | → | → | → | → | → |
| T-12 | — | 0.1 | 0.05 | — | 0.1 | 0.05 | 0.10 |
| FR | 2.5 | → | → | → | → | → | 2.5 |
| 2-ETHYLHEXANOIC ACID | — | — | — | — | — | — | 0.18 |
| TDI | 44.73 | 48.95 | 46.84 | 44.73 | 48.95 | 46.84 | 48.95 |
|  | HB | SHRANK | → | COLLAPSED | → | SETTLED BACK 50% | COLLAPSED |

| FORMULATION | 28[2] | 29 | 30 | 31[3] | 32[3] | 33[3] |
|---|---|---|---|---|---|---|
| Polyol of Ex. 1 | 100 | → | → | 100 | → | → |
| 2-ETHYLHEXANOIC ACID | — | — | — | 0.18 | → | → |
| WATER (TOTAL) | 3.60 | → | → | → | → | → |
| DEOALF | 2.0 | 2.0 | 2.0 | 0.0 | 2.0 | 1.0 |
| DC 5043 | 1.0 | → | → | → | → | → |
| 2-ETHYLHEXANOIC ACID | — | — | — | — | — | — |
| DABCO 33LV | 0.15 | → | → | → | → | → |
| NIAX A-1 | 0.05 | → | → | → | → | → |
| T-12 | 0.15 | 0.10 | 0.10 | — | 0.10 | 0.05 |
| FR | 2.5 | — | 2.5 | → | → | → |
| 2-ETHYLHEXANOIC ACID | 0.18 | — | — | — | — | — |
| TDI | 48.95 | 48.95 | 48.95 | 44.73 | 48.95 | 46.84 |
|  | SETTLED BACK 50% | SHRANK | SHRANK | COLLAPSED | HB[4] | MANY HB |

[1]2-EHA blended with surfactant
[2]2-EHA blended with flame retardant
[3]2-ethylhexanoic acid (2-EHA) Blended for 12 hours with polyol
[4]HB-health bubbles

TABLE IV

MACHINE TEST RESULT SUMMARY

| FT-45745 | DEOALF pbw | 2-EHA, pbw (stream) | Density pbw | IFD, lbs. 25/65 | Sag Factor | Air Flow cfm |
|---|---|---|---|---|---|---|
| 21 | 0.0 | — | 1.78 | 25/57 | 2.34 | 1.2 |
| 22 | 1.0 | — | | Shrank | | |
| 23 | 2.0 | — | | Shrank | | |
| 24 | 0.0 | 0.18 (Silicone) | | Collapsed | | |
| 25 | 2.0 | 0.18 (Silicone) | | Collapsed | | |
| 26 | 1.0 | 0.18 (Silicone) | | Settled Back 50% | | |
| 27 | 2.0 | 0.18 (Flame Retardant) | | Collapsed | | |
| 28 | 2.0 | 0.18 Flame Retardant) | | Settled Back 50% | | |
| 29 | 2.0 | — (No Flame Retardant) | | Shrank | | |
| 30 | 2.0 | 0.0 | | Shrank | | |
| 31 | 0.0 | 0.18 (Polyol) | | Collapsed | | |
| 32 | 2.0 | 0.18 (Polyol) | 1.78 | 23/25 | 2.55 | 1.7 |
| 33 | 1.0 | 0.18 (Polyol) | 1.82 | 24/61 | 2.53 | 1.5 |

We claim:

1. A process for the preparation of polyurethane foams from polyisocyanate polyaddition polymer polyol dispersions containing as the dispersed phase polyisocyanate polyaddition polymers formed by the reaction of an organic polyisocyanate with itself or the reaction of an organic polyisocyanate with an active hydrogen compound, wherein the improvement comprises adding to the foam formulation ingredients from 0.01 to about 3 parts by weight based on the weight of the polyisocyanate polyaddition polyol polymer dispersion, of a mono- or dicarboxylic acid having the formula $$R-[COOH]_n$$

where n is 1 or 2 and where R is a $C_1-C_{18}$ alkyl group when n is 1 and R is a $C_1-C_{18}$ alkylene group when n is 2.

2. The process of claim 1 wherein said carboxylic acid is added to the polyisocyanate polyaddition polymer polyol dispersion prior to mixing the foam formulation ingredients.

3. The process of claim 2 wherein said carboxylic acid is added to the polyisocyanate polyaddition polymer polyol dispersion at least one day prior to mixing the foam formulation ingredients.

4. The process of claim 2 wherein said carboxylic acid is added to said polyisocyanate polyaddition polymer polyol dispersion at the time said dispersion is prepared.

5. The process of claim 1 wherein said carboxylic acid is present in an amount of from 0.05 parts by weight to 0.5 parts by weight based on the weight of the polyisocyanate polyaddition polymer polyol dispersion component.

6. The process of claim 2 wherein said carboxylic acid is present in an amount of from 0.05 parts by weight to 0.5 parts by weight based on the weight of the polyisocyanate polyaddition polymer polyol dispersion component.

7. The process of claim 3 wherein said carboxylic acid is present in an amount of from 0.05 parts by weight to 0.5 parts by weight based on the weight of the polyisocyanate polyaddition polymer polyol dispersion component.

8. The process of claim 4 wherein said carboxylic acid is present in an amount of from 0.05 parts by weight to 0.5 parts by weight based on the weight of the polyisocyanate polyaddition polymer polyol dispersion component.

9. The process of claim 1 wherein said carboxylic acid is selected from the group consisting of acetic acid, propionic acid, butyric acid, and 2-ethylhexanoic acid.

10. The process of claim 3 wherein said carboxylic acid is selected from the group consisting of acetic acid, propionic acid, butyric acid, and 2-ethylhexanoic acid.

11. The process of claim 4 wherein said carboxylic acid is selected from the group consisting of acetic acid, propionic acid, butyric acid, and 2-ethylhexanoic acid.

12. The process of claim 1 wherein said polyisocyanate polyaddition polymer polyol dispersion is a PIPA dispersion.

13. The process of claim 3 wherein said polyisocyanate polyaddition polymer polyol dispersion is a PIPA dispersion.

14. The process of claim 4 wherein said polyisocyanate polyaddition polymer polyol dispersion is a PIPA dispersion.

15. The process of claim 5 wherein said polyisocyanate polyaddition polymer polyol dispersion is a PIPA dispersion.

16. The process of claim 6 wherein said polyisocyanate polyaddition polymer polyol dispersion is a PIPA dispersion.

17. The process of claim 7 wherein said polyisocyanate polyaddition polymer polyol dispersion is a PIPA dispersion.

18. A polyisocyanate polyaddition polymer polyol dispersion composition having enhanced processing latitude comprising:
   (a) a polyisocyanate polyaddition polymer dispersion in a polyol, wherein said polyisocyanate addition polymer is formed by the reaction of an organic polyisocyanate with itself or the reaction of an organic polyisocyanate with a reactive hydrogen compound;
   (b) from 0.01 to about 3 weight percent based on the weight or a) of a mono- or dicarboxylic acid having the formula:

$$R-[COOH]_n$$

wherein n is 1 or 2 and R is $C_1-C_{18}$ alkyl when n is 1 and $C_1-C_{18}$ alkylene when n is 2.

19. The composition of claim 18 wherein said carboxylic acid is a monocarboxylic acid present in an amount of from 0.05 to about 0.5 weight percent based on the weight of a).

20. The composition of claim 18 wherein said polyisocyanate polyaddition polymer polyol dispersion (a)) comprises a PIPA polyol.

21. The composition of claim 19 wherein said polyisocyanate polyaddition polymer polyol dispersion (a)) comprises a PIPA polyol.

22. The composition of claim 19 wherein said polyisocyanate polyaddition polymer polyol is a PHD polyol.

23. The composition of claim 19 wherein said polyisocyanate polyaddition polymer polyol is a PHD polyol.

24. A process for reducing/stabilizing viscosity changes in polyisocyanate polyaddition polymer polyol dispersions wherein said polyisocyanate addition polymer is formed by the reaction of an organic polyisocyanate with itself or the reaction of an organic polyisocyanate with a reactive hydrogen compound, which dispersions are subject to post-preparation changes in viscosity, comprising adding thereto a viscosity reducing/stabilizing amount of from 0.01 to 3 weight percent based on the weight of the dispersion, of a mono- or dicarboxylic acid having the formula

R—[COOH]$_2$ where n is 1 or 2 and where R is $C_1$–$C_{18}$ alkyl when n is 1 and $C_1$–$C_{18}$ alkylene when n is 2.

* * * * *